(12) United States Patent
Hogan et al.

(10) Patent No.: US 10,114,034 B2
(45) Date of Patent: Oct. 30, 2018

(54) DOOR LOCK INCLUDING SENSOR

(75) Inventors: Michael P. Hogan, Carmel, IN (US);
Howell H. Chiles, Colorado Springs, CO (US)

(73) Assignee: Ingersoll-Rand Company, Davidson, NC (US)

( * ) Notice: Subject to any disclaimer, the term of this patent is extended or adjusted under 35 U.S.C. 154(b) by 289 days.

(21) Appl. No.: 13/978,548

(22) PCT Filed: Jan. 10, 2011

(86) PCT No.: PCT/US2011/020698
§ 371 (c)(1),
(2), (4) Date: Aug. 27, 2013

(87) PCT Pub. No.: WO2012/096647
PCT Pub. Date: Jul. 19, 2012

(65) Prior Publication Data
US 2013/0327142 A1 Dec. 12, 2013

(51) Int. Cl.
*G01B 13/08* (2006.01)
*G01P 1/02* (2006.01)
(Continued)

(52) U.S. Cl.
CPC .............. *G01P 1/023* (2013.01); *E05B 45/06* (2013.01); *E05B 2045/063* (2013.01);
(Continued)

(58) Field of Classification Search
CPC ......... E05B 2045/063; E05B 2045/065; E05B 2047/0058; E05B 45/06; G01P 1/023;
(Continued)

(56) References Cited

U.S. PATENT DOCUMENTS 8,244,200 B2 * 8/2012 Orr ....................... G06F 1/3203
340/669
8,480,490 B2 * 7/2013 Ueshima ............... A63F 13/211
463/3
(Continued)

FOREIGN PATENT DOCUMENTS

DE 202009010418 12/2010
DE 202009010418 U1 * 12/2010 ............. E05B 17/22
(Continued)

OTHER PUBLICATIONS

PCT/US2011/020698 International Search Report dated Sep. 1, 2011 (8 pages).
(Continued)

*Primary Examiner* — Hezron E Williams
*Assistant Examiner* — Gedeon M Kidanu
(74) *Attorney, Agent, or Firm* — Michael Best & Friedrich LLP

(57) ABSTRACT

A door assembly includes a door panel connected to a door frame and pivotable about a pivot axis, a door latch coupled to the door panel and operable to selectively inhibit movement of the door from a closed position to an open position, and a sensor coupled to the door latch and operable to detect acceleration of the door and output acceleration data corresponding to the acceleration of the door panel in a first direction. A controller is coupled to the door latch and the sensor. The controller is operable to analyze the acceleration data to determine the cause of the acceleration.

20 Claims, 6 Drawing Sheets

(51) Int. Cl.
 *E05B 45/06* (2006.01)
 *G08B 13/08* (2006.01)
 *G08B 29/18* (2006.01)
 *E05B 47/00* (2006.01)

(52) U.S. Cl.
 CPC ... *E05B 2045/065* (2013.01); *E05B 2045/067* (2013.01); *E05B 2047/0058* (2013.01); *G08B 13/08* (2013.01); *G08B 29/18* (2013.01)

(58) Field of Classification Search
 CPC .... G08B 13/08; G08B 29/18; G07C 9/00571; G07C 9/00103; G07C 9/00674; G07C 9/0069; G07C 1/32; G07C 2009/00634; G07C 2009/00761; G07C 9/00007; G07C 9/00111; G07C 9/00142; G07C 9/00309; G07C 9/00904; E05Y 2201/434
 USPC ............ 73/12, 493, 509; 318/434, 466, 468; 49/25, 31, 138
 See application file for complete search history.

(56) References Cited

U.S. PATENT DOCUMENTS

| | | | | |
|---|---|---|---|---|
| 8,890,898 B2* | 11/2014 | Tsai | .................. | G06F 3/017 345/158 |
| 2005/0055146 A1* | 3/2005 | Ide | .................. | B60R 21/0132 701/45 |
| 2005/0253710 A1* | 11/2005 | Eskildsen | .............. | G08B 13/08 340/545.5 |
| 2006/0250578 A1* | 11/2006 | Pohl | .................. | G06F 3/0238 351/210 |
| 2007/0109111 A1* | 5/2007 | Breed | ................. | B60N 2/2863 340/435 |
| 2007/0176437 A1* | 8/2007 | Marschalek | ........ | E05B 47/0011 292/347 |
| 2007/0176776 A1* | 8/2007 | Kashiwagi | ............. | G08B 13/08 340/545.1 |
| 2008/0055040 A1* | 3/2008 | Lizza | ................... | G07C 9/00111 340/5.7 |
| 2009/0249699 A1* | 10/2009 | Yulkowski | .............. | E05F 15/00 49/349 |
| 2010/0045053 A1* | 2/2010 | Dye | .................... | E05B 47/0012 292/201 |
| 2010/0103096 A1* | 4/2010 | Yamamoto | ............ | G06F 3/0346 345/157 |
| 2010/0242368 A1* | 9/2010 | Yulkowski | ............... | E05F 15/20 49/349 |
| 2010/0283579 A1* | 11/2010 | Kraus | ................ | G07C 9/00944 340/5.7 |
| 2011/0016971 A1* | 1/2011 | Yulkowski | .............. | E05F 15/40 73/493 |
| 2012/0055091 A1* | 3/2012 | Backherms | ......... | A47L 15/4259 49/31 |
| 2013/0327142 A1* | 12/2013 | Hogan | .................... | E05B 45/06 73/493 |

FOREIGN PATENT DOCUMENTS

| | | | |
|---|---|---|---|
| JP | 09067964 A | 3/1997 | |
| JP | 2005330651 A | 12/2005 | |
| KR | 1020040010414 A | 1/2004 | |
| KR | 20050022919 A | 3/2005 | |
| WO | 2007048908 | 5/2007 | |
| WO | WO 2007048908 A1 * | 5/2007 | ............. G01P 13/00 |
| WO | 2009088901 A1 | 7/2009 | |

OTHER PUBLICATIONS

Extended European Search Report for Application No. 11855612.5 dated Aug. 24, 2015 (6 pages).

* cited by examiner

DOOR LOCK INCLUDING SENSOR

BACKGROUND

The present invention relates to door locks. More particularly, the invention relates to door locks that include sensors that can detect the motion of the door.

Electronic door locks are commonly used in commercial settings and are increasingly being used in residential applications. Some of the electronic door locks can provide an alarm function or can be connected as an input to an alarm system to enhance the security of the building or facility.

SUMMARY

In one embodiment, the invention provides a door assembly that includes a door panel connected to a door frame and pivotable about a pivot axis, a door latch coupled to the door panel and operable to selectively inhibit movement of the door from a closed position to an open position, and a sensor coupled to the door latch and operable to detect acceleration of the door and output acceleration data corresponding to the acceleration of the door panel in a first direction. A controller is coupled to the door latch and the sensor. The controller is operable to analyze the acceleration data to determine the cause of the acceleration.

In another embodiment the invention provides a door assembly that includes a door panel connected to a door frame and pivotable about a pivot axis, a door latch coupled to the door panel and operable to selectively inhibit movement of the door panel from a closed position to an open position, and a first sensor coupled to the door latch and operable to detect a first acceleration of the door panel produced by a centripetal force. A second sensor is coupled to the door latch and is operable to detect a second acceleration of the door and a controller is coupled to the door latch, the first sensor, and the second sensor. The controller is operable to determine if the second acceleration is a result of a normal door closure based at least partially on a measurement taken by the first sensor immediately preceding the second acceleration.

In another embodiment the invention provides a method of determining the cause of a first acceleration at a door. The method includes supporting the door for pivotal movement about a hinge axis, coupling a door latch to the door, the door latch operable to selectively inhibit movement of the door from a closed position to an open position, and sensing accelerations applied to the door. The method also includes sensing angular movement of the door about the hinge axis and determining the cause of the first acceleration by analyzing a magnitude of the first acceleration in combination with a magnitude of the angular movement measured immediately prior to the first acceleration.

In yet another embodiment, the invention provides a door assembly that includes a door panel connected to a door frame and pivotable about a pivot axis, a door latch coupled to the door panel and operable to selectively inhibit movement of the door panel from a closed position to an open position, and a sensor coupled to the door latch and operable to detect rotation of the door panel about the pivot axis, and to detect an acceleration of the door panel. A controller is coupled to the door latch and the sensor. The controller is operable to determine if the acceleration measured by the sensor is a result of a normal door closure based at least partially on a measurement taken by the sensor of the rotation of the door panel immediately preceding the acceleration.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
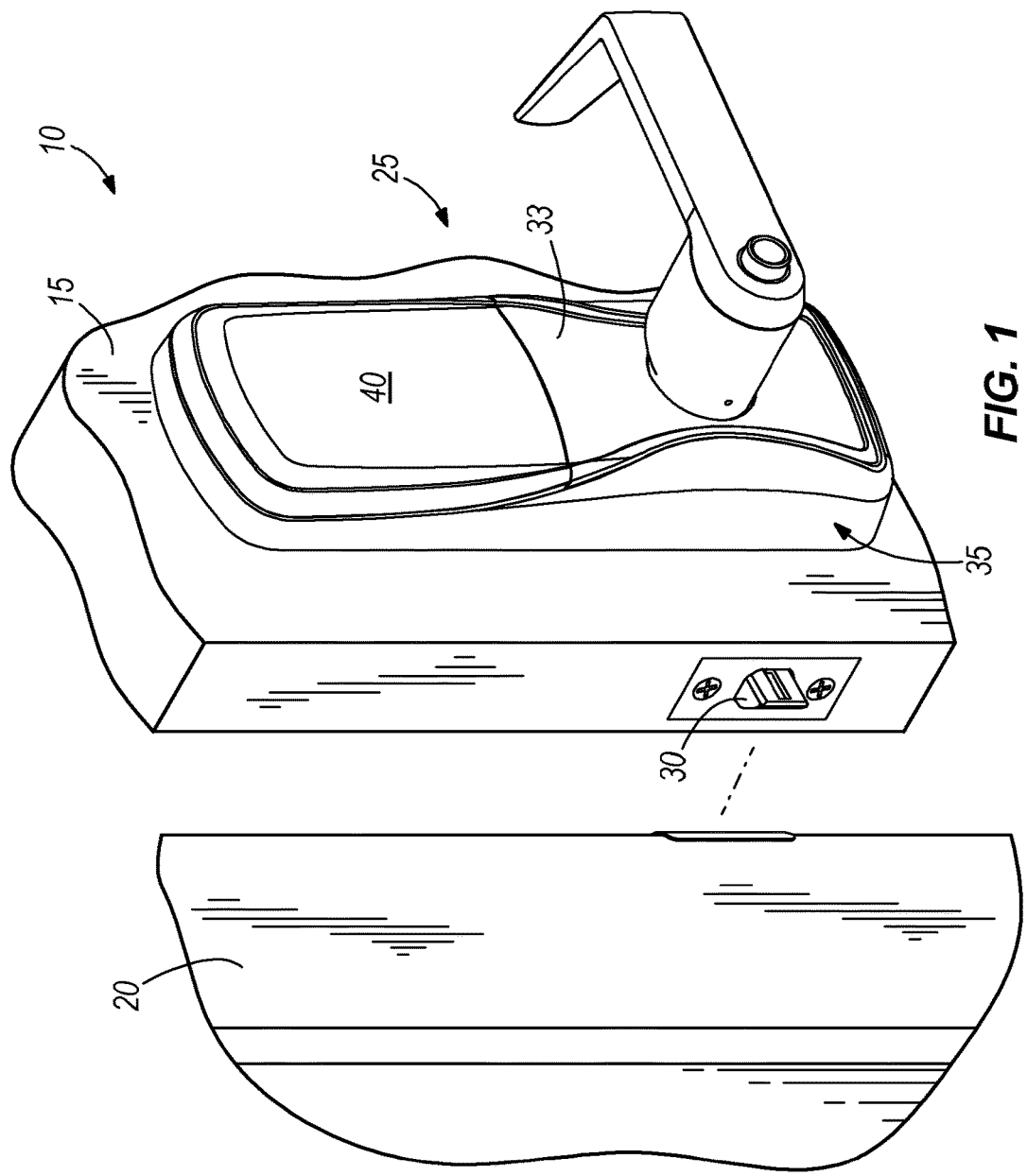
FIG. 1 is a perspective view of a portion of door including an electronic door lock.

FIG. 1 illustrates a doorway or door assembly 10 that includes a door panel 15 pivotally supported within a frame 20. A lock mechanism 25 is coupled to the door panel 15 and operates to selectively inhibit movement of the door panel 15 from a closed position to an open position. The lock mechanism includes a latch 30 and an electronic actuator 33 having an interior portion 35 and an exterior portion attached to the door panel 15 to electronically control access via the door 10. FIG. 1 illustrates the interior portion 35 of the electronic actuator 33. Typically, the interior portion 35 of the electronic actuator 33 includes a housing 40 that covers the electronics that make the access decision and an actuator that moves the mechanical components to open the door 10. The exterior portion of the electronic actuator 33 typically includes an input device such as a keypad, card reader, biometric scanner, and the like that read data from a user wishing to gain entry. The data provided at the exterior portion 35 of the electronic actuator 33 is then used to make an access decision or is transmitted to a remote device that makes the access decision.

Before proceeding, it should be noted that the description contained herein is directed to a system that includes an electronic actuator 33. However, the present invention could be applied to purely mechanical door locks as well if desired.

Figure 2:
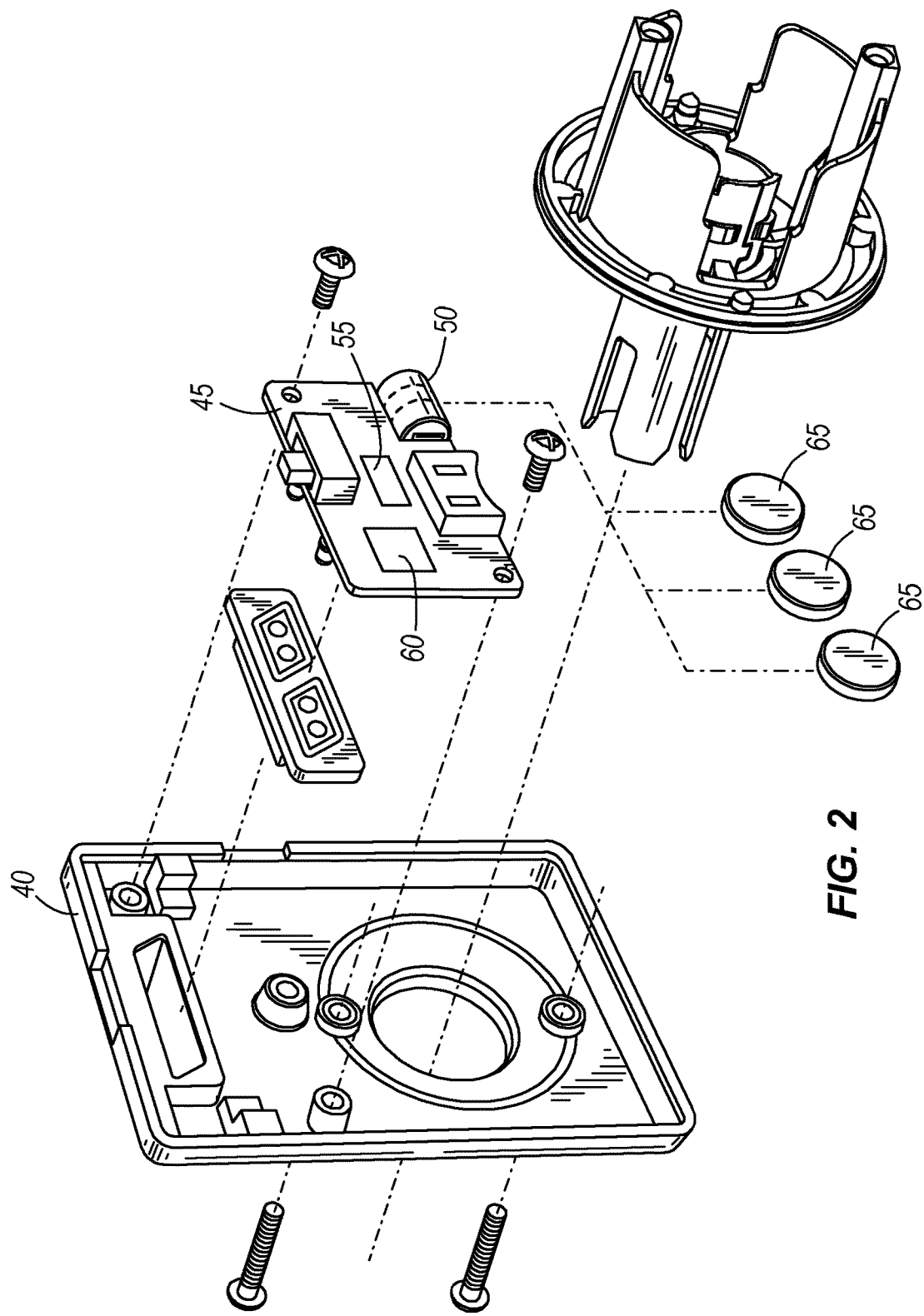
FIG. 2 is an exploded perspective view of the electronic door lock of FIG. 1.
Figure 3:
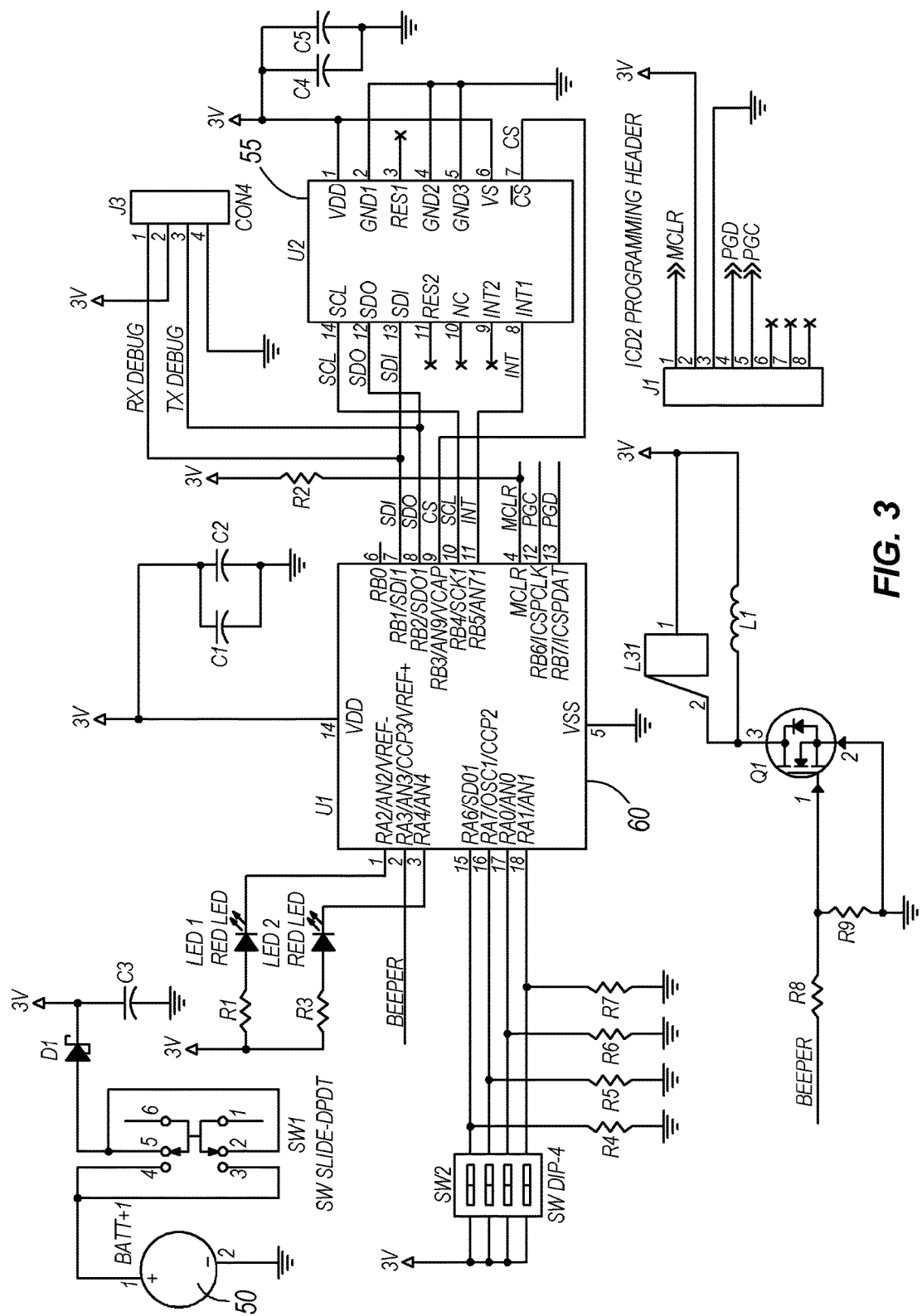
FIG. 3 is a schematic diagram of an acceleration detection circuit of the electronic door lock of FIG. 1.

As illustrated in FIG. 2, the interior portion 35 of the electronic actuator 33 includes a housing 40 that contains a circuit board 45 that supports a power supply 50, a sensor 55, and a controller 60. The power supply 50 includes one or more batteries 65 in the form of coin cells that are operable to provide the main power to the circuit board 45 or alternatively to provide back up power should a main power supply fail. In one construction, an AC power supply is provided as main power with the battery or batteries 65 providing back up power. It should be noted that many different batteries having many different voltage outputs, shapes, and sizes could be employed as desired.

The sensor 55 is positioned on the circuit board 45 and is connected to the power supply 50 and the controller 60. In one construction the sensor 55 includes an accelerometer capable of measuring acceleration in one or more directions. In a preferred construction, a microelectromechanical system (MEMS) arrangement is employed as the accelerometer. The MEMS accelerometer is capable of measuring acceleration in one or more axes with three axes being preferred. Example of MEMS based accelerometers suitable for use in the illustrated device are manufactured by FREESCALE SEMICONDUCTOR having a principle place of business in Tempe, Ariz. and sold under the part numbers MMA7330L and MMA7341L.

For purposes of this application, a single sensor 55 that measures acceleration in more than one direction can be considered as separate sensors 55 that each measure acceleration in a single direction or can be considered a single sensor 55. Each of the suitable MEMS based accelerometers noted herein provides a unique output signal that corresponds to the acceleration in one of three directions. Thus, an external device receives three separate signals that could be provided by a single acceleration measuring device or three separate acceleration measuring devices. In other constructions, one or more separate one axis sensors 55 can be employed to measure acceleration.

The controller 60 is positioned on the circuit board 45, is powered by the power supply 50, and receives signals from the sensor 55. In one construction, the controller 60 receives a single acceleration signal. The signal is analyzed by the controller 60 to determine if the measured acceleration exceeds a predetermined threshold 70. If the threshold 70 is exceeded, the controller 60 can store the measured data and can initiate an alarm if the measured data is indicative of an attempted forced entry. However, if only one axis of acceleration is measured, the system is susceptible to false alarms when the door panel 15 is slammed or closed quickly. Thus, in a preferred construction, signals indicative of acceleration in two or more directions are provided to the controller 60.

In some constructions, the controller 60 includes a microcontroller that is operable in a sleep state or an operating state to conserve power. When an acceleration is detected that exceeds a wake threshold 75, the micro-controller or controller 60 transitions from the sleep state to the operating state to perform the analysis necessary to determine the cause of the acceleration.

Figure 4:
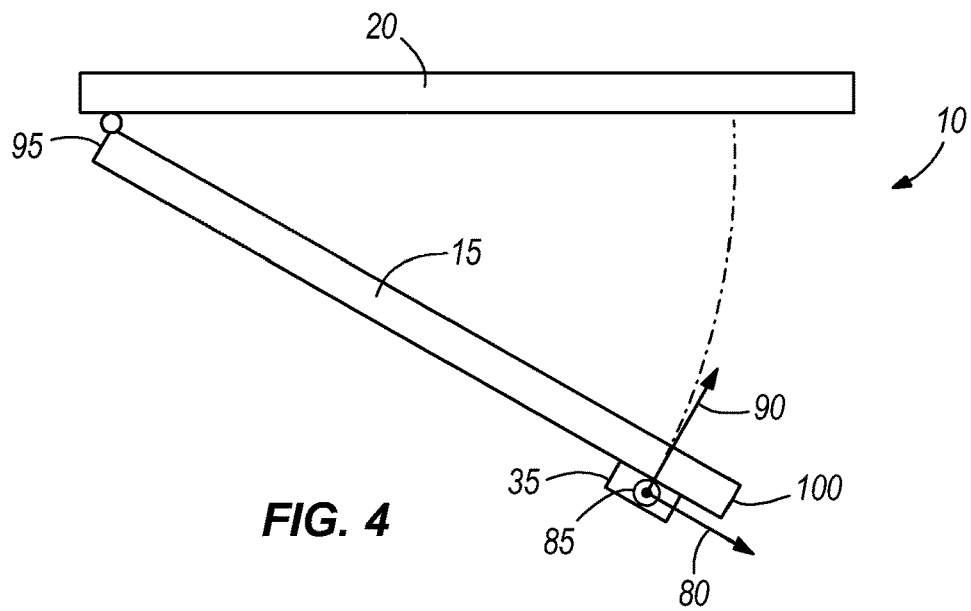
FIG. 4 is a top schematic view of the door of FIG. 1.

FIG. 4 schematically illustrates the doorway 10 with the door panel 15 in the open position. The axes along which accelerations are measured are illustrated as an X-axis 80, a Y-axis 85, and a Z-axis 90. The X-axis 80 extends in the width or horizontal direction from the edge 95 of the door panel 15 that is connected to the frame 20 to the edge 100 of the door panel 15 that selectively engages the door frame. The Y-axis is normal to the X-axis and extends vertically from the bottom edge of the door to the top edge of the door. The Z-axis is normal to the X-axis and the Y-axis and extends in a direction that is substantially tangent to an arc defined by the location of the accelerometer as the door moves between the open position and the closed position.

Figure 5:
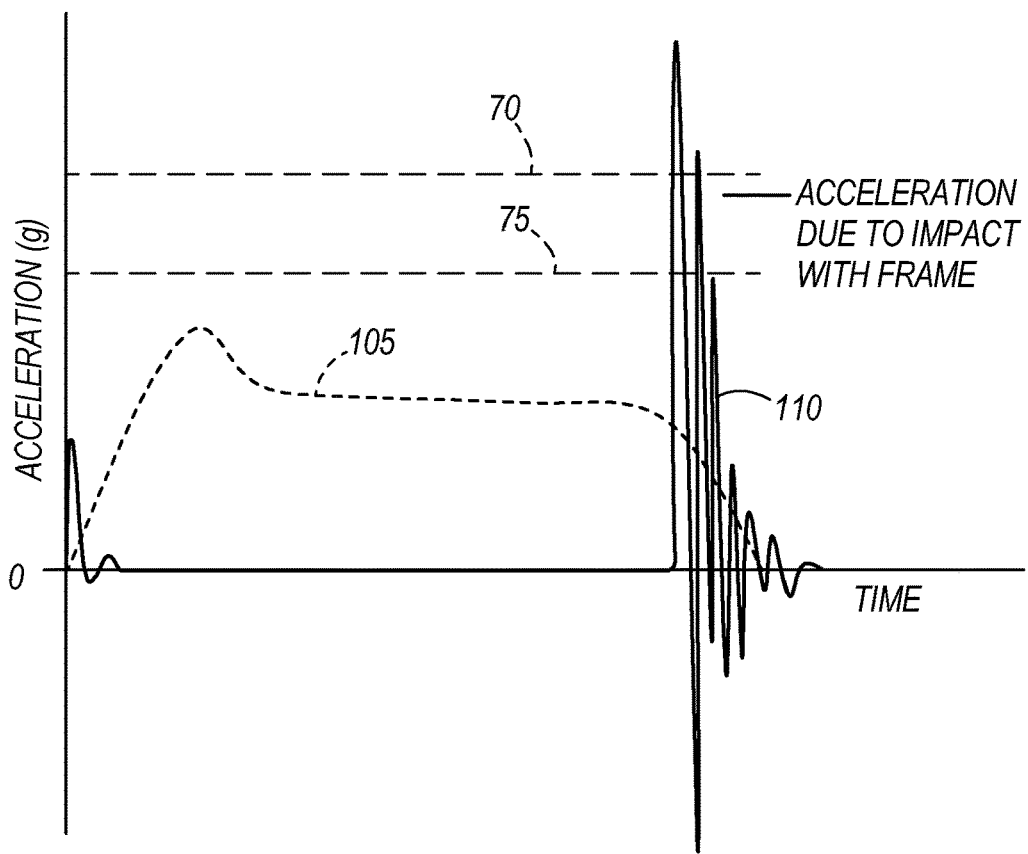
FIG. 5 is a graphical representation of the measured acceleration of a door during a normal close.

FIG. 5 graphically illustrates the measurements taken during a normal door closure with a system that measures acceleration in at least two directions. More specifically, FIG. 5 illustrates the accelerations measured in the X-axis as a first curve 105 and the Z-axis as a second curve 110 as the door panel 15 moves from a stationary open position to a stationary closed position. As the user begins to close the door panel 15, acceleration is measured in both the X and Z directions. Eventually, the angular acceleration of the door panel 15 approaches zero such that the door panel 15 moves with a constant angular velocity toward the closed position. Thus, the accelerations in the Y-axis and Z-axis directions approach zero. However, the constant angular velocity of the door panel 15 does produce a substantially constant centripetal acceleration that is detected and displayed as acceleration in the X-axis direction. As the door panel 15 contacts the frame 20 near the closed position, the angular velocity (and the X-axis acceleration) begins to drop. Simultaneously, accelerations are measured in the Z-direction and potentially in the Y-direction. The magnitude of these accelerations and the direction of these accelerations vary depending on the velocity of the door panel 15 as well as the lock mechanism 25 employed. Thus, different patterns of acceleration will be produced by different doors 10 with the second curve 110 illustrating one example.

FIG. 5 also illustrates one possible wake threshold 75 and one possible alarm threshold 70. Of course other threshold levels 70, 75 could be employed if desired. In addition, the wake threshold 75 could be eliminated and the controller 60 could always remain in the operating state if desired.

The controller 60 will identify the curves of FIG. 5 as being indicative of a normal door closure. Specifically, the controller 60 will detect the accelerations at the end of the second curve 110 and will identify them as a potential attempted forced entry as they exceed the alarm threshold 70. However, the non-zero level of acceleration immediately prior to the acceleration illustrated in the first curve 105 would be detected by the controller 60 and would indicate that the door panel 15 was moving just prior to the large acceleration. The controller 60 would thus determine the cause of the high acceleration indicated by the first curve 105 at least partially by analyzing the acceleration of the second curve 110 just prior to the large detected acceleration. Thus, if a user slams the door panel 15, thereby producing accelerations at the end of the closure significantly higher than those illustrated or accelerations above the alarm set point 70, the controller 60 will prevent the alarm from being triggered.

In constructions that employ a single axis sensor 55, the sensor 55 will typically be oriented to measure accelerations along the Z-direction 90. Thus, during a normal door closure as illustrated in FIG. 5, only the second curve 110 will be available. However, the controller 60 can still identify this as a normal door closure event based on the initial acceleration caused as the user accelerates the door from a stationary condition to a moving condition followed a few seconds later by the accelerations produced during contact with the door frame 20.

Figure 6:
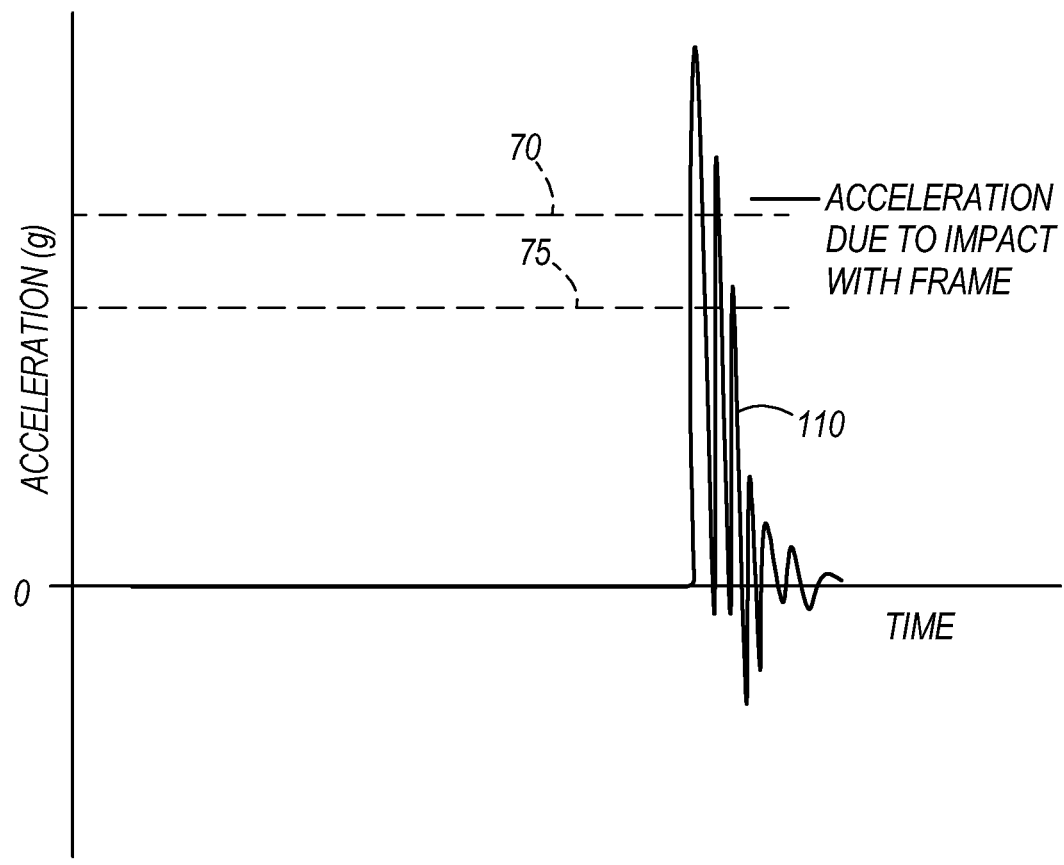
FIG. 6 is a graphical representation of the measured acceleration of a door during an attempted forced entry.

FIG. 6 illustrates the measured accelerations from the sensor 55 during an attempted forced entry. Typically, a forced entry produces significant acceleration in the Z-axis 90 with smaller accelerations in the X-axis 80 and Y-axis 85 directions. There is no acceleration similar to the X-axis 80 acceleration produced during movement of the door panel 15 toward the closed position, thereby making it easier for the controller 60 to identify this as an attempted forced entry rather than a normal closure. Thus, the controller can record the accelerations to document the attempted forced entry and can trigger an alarm even if the alarm threshold 70 is not exceeded.

As one of ordinary skill will realize, the controller 60 can be programmed to identify many different normal activities based on the measured accelerations to further reduce false alarms that might occur. The use of multiple accelerometers or a single accelerometer that measures acceleration in various directions provides additional information to the controller 60 to make it easier to filter normal activities from attempted forced entries.

The use of a multi-axis sensor 55 provides for the ability to monitor door openings and closings. Thus, the number of times a door opens or closes could be tracked and maintenance schedules could be set based on the number of openings and closings. In addition, the status of the doors could be monitored to verify that they are in the desired state. For example, doors that lead to secured areas could be monitored to verify that they are in the desired position. Thus, a door that is supposed to remain closed could be monitored to verify that the door closes within a predetermined time period after it opens. If the door does not close an alarm could be triggered. In arrangements that include only a single axis sensor 55, other sensors could be employed such as a door position sensor, a latch position sensor, and the like. As one of ordinary skill will realize, the multi-axis sensor 55 is advantageous as it can monitor the door position and the door status without the need for an additional sensor.

Figure 7:
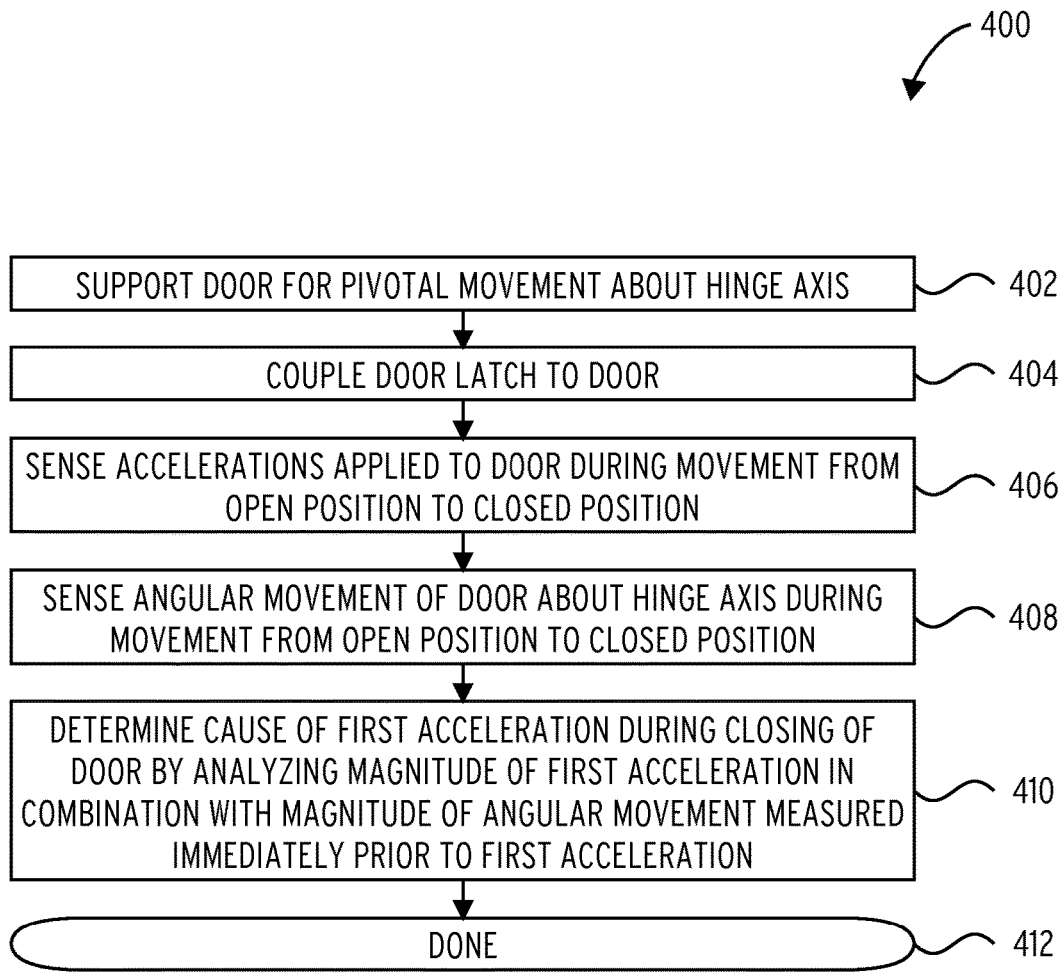
FIG. 7 is a flow chart of one possible method of analyzing accelerations applied to a door.

FIG. 7 is a flow chart illustrating a method 400 discussed above with regard to FIG. 5. Before proceeding, it should be noted that the flow chart is not intended to convey a required order of the steps as they can be performed in a different order. In addition, none of the steps should be considered as required, nor is the flow chart a complete representation of all of the possible steps that could be performed. As illustrated in FIG. 7, the method 400 includes supporting a door for pivotal movement about an axis (step 402) and coupling a door latch to the door (Step 404). The method also includes sensing acceleration applied to the door during movement from an open position to a closed position (step 406) and sensing angular movement of the door about the hinge axis during the aforementioned movement (step 408). The method further includes determining the cause of a first acceleration by analyzing the magnitude of a first acceleration in combination with the magnitude of angular movement measured immediately prior to the first acceleration (step 410).

Thus, the invention provides, among other things, a door system that includes a lock that is operable to measure vibrations. More specifically, the invention provides a door system that includes a lock that can sense and detect an attempted forced entry. Various features and advantages of the invention are set forth in the following claims.

We claim:
1. A door assembly comprising:
a door panel connected to a door frame and pivotable about a pivot axis;
a door latch coupled to the door panel and operable to selectively inhibit movement of the door from a closed position to an open position;
a sensor coupled to the door latch and operable to detect acceleration of the door and output acceleration data corresponding to the acceleration of the door panel in a first direction; and
a controller coupled to the door latch and the sensor, the controller operable to analyze a change in the acceleration data during movement from the open position to the closed position to determine the cause of the acceleration, wherein the sensor is operable to measure a first acceleration produced by a centripetal force and a second acceleration, and wherein the controller determines the cause of the second acceleration at least partially in response to a measurement of the first acceleration.

2. The door of claim 1, wherein the door latch includes a lock operable to lock the door in the closed position.

3. The door of claim 1, further comprising an alarm triggerable by the controller in response to acceleration data indicative of a forced entry attempt.

4. The door of claim 1, wherein the sensor includes a multi-axis sensor operable to detect the magnitude of acceleration in multiple directions.

5. The door of claim 1, wherein the controller includes a micro-controller operable in a sleep state and an operating state, and wherein the micro-controller remains in the sleep state until an acceleration over a non-zero preset threshold is detected.

6. The door assembly of claim 1, wherein the controller determines that the cause of the second acceleration is a normal door closure if the first acceleration is a non-zero acceleration.

7. A door assembly comprising:
a door panel connected to a door frame and pivotable about a pivot axis;
a door latch coupled to the door panel and operable to selectively inhibit movement of the door panel from a closed position to an open position;
a first sensor coupled to the door latch and operable to detect a first acceleration of the door panel produced by a centripetal force during movement from the open position to the closed position;
a second sensor coupled to the door latch and operable to detect a second acceleration of the door during movement from the open position to the closed position; and
a controller coupled to the door latch, the first sensor, and the second sensor, the controller operable to determine if the second acceleration is a result of a normal door closure based at least partially on a measurement taken by the first sensor immediately preceding the second acceleration.

8. The door of claim 7, wherein the door latch includes a lock operable to lock the door in the closed position.

9. The door of claim 7, wherein the first sensor and the second sensor are part of a multi-axis accelerometer operable to detect the magnitude of acceleration in multiple directions.

10. The door of claim 7, wherein the controller includes a micro-controller operable in a sleep state and an operating state, and wherein the micro-controller remains in the sleep state until one of the first sensor and the second sensor detects an acceleration over a preset threshold.

11. The door of claim 7, wherein the first sensor includes an accelerometer operable to measure a magnitude of the first acceleration in a first direction.

12. The door of claim 11, wherein the second sensor includes an accelerometer operable to measure the magnitude of the second acceleration in a second direction.

13. A method of determining the cause of a first acceleration at a door comprising:
supporting the door for pivotal movement about a hinge axis;
coupling a door latch to the door, the door latch operable to selectively inhibit movement of the door from a closed position to an open position;
sensing accelerations applied to the door during movement from the open position to the closed position;
sensing angular movement of the door about the hinge axis during movement from the open position to the closed position; and
determining the cause of the first acceleration during the closing of the door by analyzing a magnitude of the first acceleration in combination with a magnitude of the angular movement measured immediately prior to the first acceleration.

14. The method of claim 13, wherein the sensing accelerations step includes sensing a magnitude and direction of the accelerations.

15. The method of claim 14, wherein the sensing angular movement step includes sensing a magnitude of an acceleration of the door along a centripetal axis that extends substantially horizontally from the hinge axis.

16. The method of claim 15, wherein a normal door closure is detected in response to a first acceleration in a first direction immediately preceded by the detection of a non-zero angular movement of the door along the centripetal axis.

17. A door assembly comprising:
a door panel connected to a door frame and pivotable about a pivot axis;
a door latch coupled to the door panel and operable to selectively inhibit movement of the door panel from a closed position to an open position;
a sensor coupled to the door latch and operable to detect angular movement of the door panel about the pivot axis, and to detect an acceleration of the door panel during angular movement from the open position to the closed position; and
a controller coupled to the door latch and the sensor, the controller operable to determine if the acceleration measured by the sensor is a result of a normal door closure based at least partially on a measurement taken by the sensor of the angular movement of the door panel immediately preceding the acceleration.

18. The door of claim 17, wherein the controller includes a micro-controller operable in a sleep state and an operating state, and wherein the micro-controller remains in the sleep state until the sensor detects an acceleration over a preset threshold.

19. The door of claim 17, wherein the sensor includes a multi-axis accelerometer operable to detect the magnitude of acceleration in multiple directions.

20. The door of claim 19, wherein the sensor measures acceleration in a first direction, the acceleration in the first direction caused by a centripetal force and being indicative of rotation of the door panel about the pivot axis.

* * * * *